United States Patent
DaCosta

(10) Patent No.: US 8,314,892 B2
(45) Date of Patent: *Nov. 20, 2012

(54) MOBILE TV SYSTEM AND METHOD WITH FAST CHANNEL CHANGE

(75) Inventor: Behram Mario DaCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,404

(22) Filed: May 17, 2011

(65) Prior Publication Data

US 2011/0221969 A1 Sep. 15, 2011

Related U.S. Application Data

(63) Continuation of application No. 12/203,378, filed on Sep. 3, 2008, now Pat. No. 8,023,048, which is a continuation of application No. 11/314,920, filed on Dec. 20, 2005, now Pat. No. 7,466,367.

(51) Int. Cl.
*H04N 5/63* (2006.01)

(52) U.S. Cl. ......... 348/730; 348/731; 348/552; 348/838
(58) Field of Classification Search .......... 348/730–733, 348/725, 569, 460–461, 552, 837–838; 455/556.1, 455/574, 550.1, 343.1; 725/37–38, 131, 725/139, 151; *H04N 5/63*
See application file for complete search history.

(56) References Cited

U.S. PATENT DOCUMENTS

| 7,317,495 B2 * | 1/2008 | Takahashi | 348/838 |
| 7,466,367 B2 * | 12/2008 | DaCosta | 348/730 |
| 8,023,048 B2 * | 9/2011 | Dacosta | 348/730 |

* cited by examiner

*Primary Examiner* — Trang U Tran
(74) *Attorney, Agent, or Firm* — John L. Rogitz

(57) ABSTRACT

To reduce latency during channel change, when a user changes the TV channel on a mobile TV device such as a wireless phone, the device leaves the power save mode and enters, for a limited timeout period, a fully energized mode in which the receiver and front end logic of the device remain energized during periods in which content from the old channel, content from the new channel, and content from a "next" channel are interleaved into the broadcast.

20 Claims, 2 Drawing Sheets

MOBILE TV SYSTEM AND METHOD WITH FAST CHANNEL CHANGE

This is a continuation of and claims priority to U.S. patent application Ser. No. 12/203,378, filed Sep. 3, 2008, now U.S. Pat. No. 8,023,048, which is a continuation of U.S. patent application Ser. No. 11/314,920, filed Dec. 20, 2005, now U.S. Pat. No. 7,466,367. Priority is claimed to both of these applications.

I. FIELD OF THE INVENTION

The present invention relates generally to providing content from multiple television channels to mobile wireless devices such as wireless telephones.

II. BACKGROUND OF THE INVENTION

"Mobile TV" refers to over-the-air broadcast or multicast of TV content to handheld devices such as cell phones. Several technologies have been proposed for mobile TV, including DVB-H, DMB, 3G Based technologies and the "MediaFlo" system.

As understood herein, in general mobile TV broadcast technologies improve upon non-Mobile TV broadcast technologies by improving Forward Error Correction (FEC) as well as receiver battery life, both of which advances are desired for mobile devices.

As further understood herein, however, in seeking to preserve battery power, a tradeoff is made that increases the latency (delay) of the broadcast content. In understanding why, several channels may be time-sliced onto one broadcast, i.e., the content of one channel, might be broadcast at a high data rate for two seconds, followed by the content of another channel at a high data rate, for two seconds, followed the content of yet a third channel at a high data rate for two seconds, and so on. Hence, a mobile receiver's radio and front end logic need only be energized for the two seconds in which the user-selected channel is broadcast out of every cycle, remaining off and thus saving power for the remaining time. To this end, the receiver is notified via system information packets and packet IDs when the contents of a particular program will be broadcast as well as the duration of the on and off periods.

But as recognized herein, the above power-saving protocol imposes a relatively lengthy delay if the user changes the channel, forcing the user to wait up to a complete cycle until the content for the new channel arrives. This, delay is annoying particularly to users who tend to frequently "channel hop".

SUMMARY OF THE INVENTION

A method for providing TV content includes receiving a channel change command and in response energizing a portion (such as the radio and front end logic) of a mobile TV device at least during periods in which content from an old channel and content from a new channel are present in a TV signal. Preferably, the portion is also energized during periods in which content from a "next" channel is present in the TV signal. This mode is referred to herein as the multiple, channel reception mode. The portion may be automatically deenergized after a timeout period during all periods except periods in which content from the new channel is present in the TV signal to assume a power save mode.

In some implementations, the "next" channel is the channel having content sent in the TV signal immediately after content from the new channel is sent in the TV signal. In other implementations, the "next" channel is a user-designated favorite channel.

The mobile TV device can be configured in the multiple channel reception mode in response to a scan command, and also in response to a surf command, with the timeout period effectively being set to infinity in the latter case. In the multiple channel reception mode, content can be received at relatively low bit rate compared to the bit rate used the power save mode.

In another aspect, a mobile TV device includes a wireless receiver, a command input device, and a display device configured to display TV signals. A processor communicates with these elements. The processor configures a portion of the mobile TV device in a power save mode during TV viewing using the device until a channel change command is received from the command input device, at which point the processor configures the portion in a multiple channel reception mode at least until a timeout period elapses.

In yet another aspect, a mobile TV device includes a circuit for processing a TV signal carrying content from at least first and second TV channels, and means for inputting a channel change command. Logic means are provided for configuring the circuit in a reduced power mode, wherein the circuit is energized only for portions of the TV signal carrying content from the first TV channel. Also, logic means that are responsive to the means for inputting configure the circuit in a multiple channel reception mode, wherein the circuit is energized at least for portions of the TV signal carrying content from the first TV channel and for portions of the TV signal carrying content from the second TV channel.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
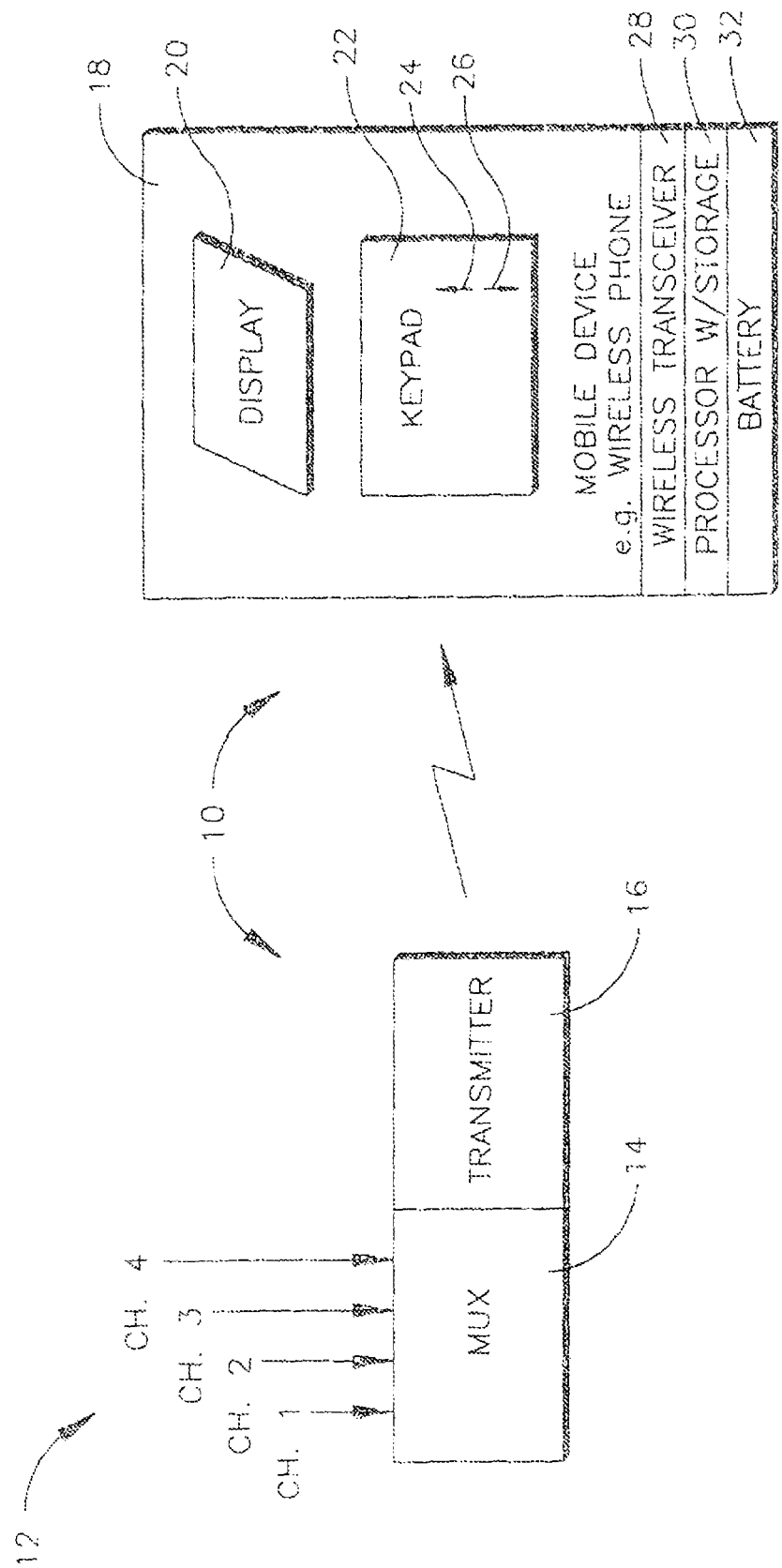
FIG. 1 is a schematic diagram of a non-limiting mobile TV system.

Referring initially to FIG. 1, a mobile TV system is shown, generally designated 10, which includes at least one transmitting station 12 that combines content from multiple TV channels (four shown in FIG. 1) in a TV signal. Accordingly, FIG. 1 shows that the transmitting station 12 can include a multiplexer 14 that essentially interleaves the channel signals into a single stream in accordance with principles discussed above for wireless transmission thereof by a transmitter 16 to one or more mobile TV devices 18, such as but not limited to wireless telephones. The particular type of over-the-air broadcast or multicast paradigm used may be, without limitation, DVB-H, DMB, 3G Based technologies, and the "MediaFlo" system.

In the non-limiting embodiment shown in FIG. 1, the mobile TV device includes a display 20 that can display TV signals and a keypad 22 or other data entry device that a user can manipulate. The keypad 22 may include a channel up key 24 and a channel down key 26, as well as other keys, e.g., a channel surf key and a channel scan key. The channel up and down keys 24, 26 alternatively may be considered to be "next" channel keys and "previous" channel keys.

The TV signal from the transmitting station 12 is received in a wireless receiver, such as a wireless transceiver 28, that is controlled by a processor 30. The processor 30 may include associated data storage: A battery 32 powers the mobile TV device 18. All of the components of the mobile TV device 18 may be on a single housing.

Figure 2:
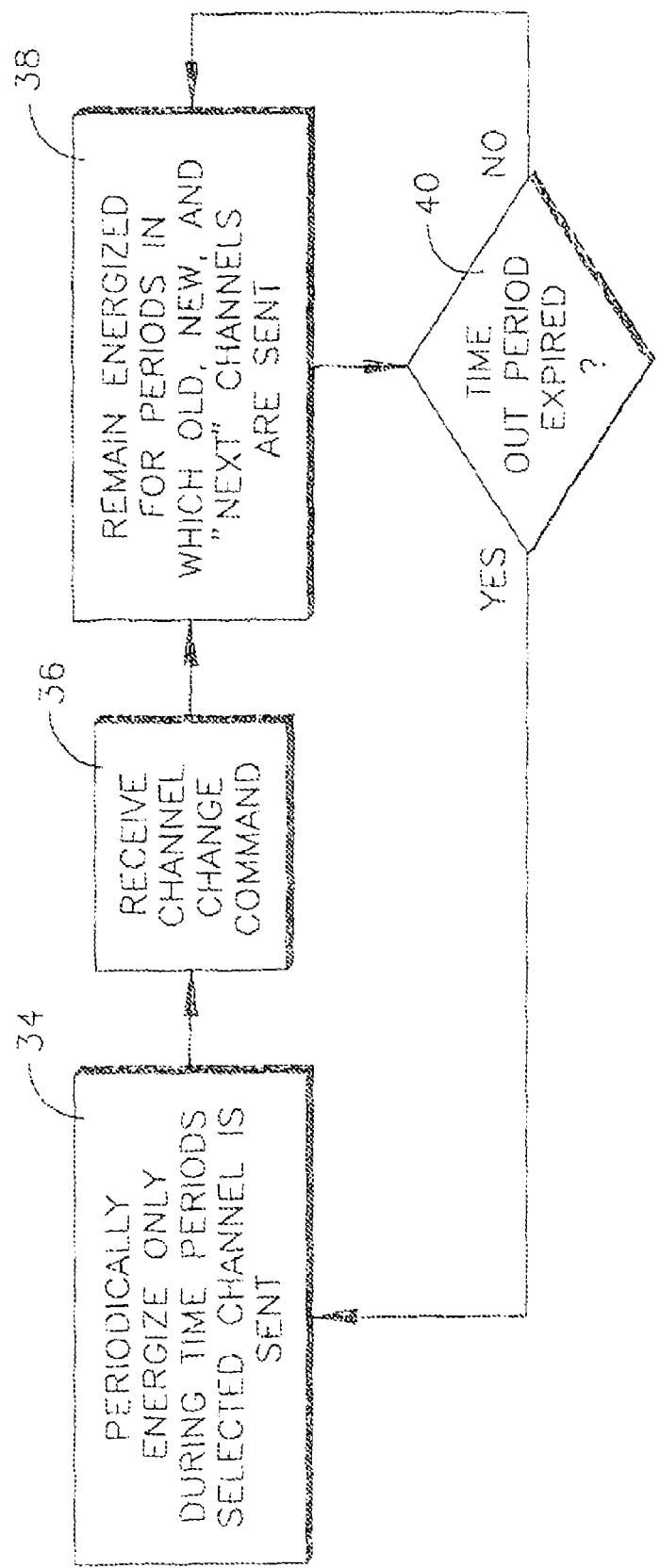
FIG. 2 is a flow chart of example logic in accordance with the invention.

FIG. 2 shows logic that may be executed by the processor 30 in accordance with present principles. The processor 30 may access one or more software or hardware elements to undertake the logic. The flow chart illustrates the structure of the logic modules of one non-limiting embodiment of the present invention as embodied in computer program software. Those skilled in the art will appreciate that the flow chart illustrates the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor as a series of computer-executable instructions. In addition to residing on disks, these instructions may reside, for example, in RAM or other solid state memory of the appropriate computer, or the instructions maybe stored on magnetic tape, electronic read-only memory, or other appropriate data storage device.

Commencing at block 34, a power save mode is established in which a portion of the mobile TV device is deenergized for all periods of the TV signal from the transmitting station 12 except for the periods that carry content (typically packetized) from a TV channel that previously has been selected by the user. This channel may be regarded, as an "old" channel. Substantially the entire mobile TV device 18 is energized during periods in which "old" channel content is carried so that the content may be processed and displayed on the display 20 in accordance with TV principles known in the art. Otherwise, i.e., during periods that do not carry content from the selected channel, portions of the mobile TV device 18 are deenergized, to conserve the battery 32. These portions may include, by way of non-limiting example, the radio (i.e., the transceiver 28) and front end logic components of the mobile TV device 18. In any case, all content may be carried on a single frequency, or multiple frequencies may be used.

If the user desires to change channels, manipulates the keypad, 22 accordingly, e.g., by depressing the channel "up" key 24, in which case the logic flows to block 36, to receive the channel change command. Reception of a channel change command causes the logic to move to block 38, wherein the processor 30 configures the mobile TV device 18 in a multiple channel reception mode as follows. In the multiple channel reception mode, the content for the old channel, newly-selected channel, and preferably a "next" channel are all received, i.e., substantially the entire mobile TV device 18 is energized during periods corresponding to transmission of content from the above three channels. Typically this does not require tuning to a different frequency channel when, e.g., the DVB-H protocol is used.

In the multiple channel reception mode, the logic loops to decision diamond 40, wherein it is determined whether a timeout period has elapsed since, e.g., the channel change command was received. If not, the logic causes the mobile TV device 18 to remain in the multiple channel reception mode as shown; otherwise, the logic loops back to block 34 to reconfigure the mobile TV device 18 into the power save mode.

With the above logic in mind, it can now be appreciated that if the user again presses, e.g., a "previous channel" or "next channel" key, when in the multiple channel reception mode, the channel change latency will be greatly reduced compared to what it is in the power save mode. The purpose of the "time out" duration mentioned above thus is to revert to receiving a single channel to save battery power when the user appears to have stopped "channel hopping".

While the effect of depressing keys for, e.g., "previous channel" and "current channel" are evident, the concept of "next channel" may email more variability. By way of non-limiting example, two possibilities might be that the "next channel" key simply increments the channels in the order broadcast or presented by the broadcaster, e.g., in the sequence in which the transport stream packets are multiplexed in the broadcast, or the "next channel" key may lead to display of the next "favorite" channel that may have been programmed by the user. Accordingly, while in multiple channel reception mode, the mobile TV device 18 preferably determines what would constitute the appropriate "next channel" depending on the functions being performed by the "next channel" key being pressed.

In some implementations, the multiple channel reception mode also may be enabled in other cases. For instance, the multiple channel reception mode may be entered if the user selects a "scan channels" option, where the mobile TV device 18 automatically increments to the next channel, displays the content for a fixed period of time, increments to the channel, and so on. The multiple channel reception mode may also be permanently invoked (i.e., the timeout period in effect is set to infinity) when the user selects a "channel surf mode" option, unless and until the channel surf mode is disabled by the user.

Further, in some embodiments, for broadcast protocols and AV codecs that support multiple layered encoding, channels received in the multiple channel, reception mode can be received at the lower bit rates than a channel is received in the power save mode, to decrease total power consumption and to reduce use of device system resources.

It should be understood that variations are contemplated such as implementations that result from, replacing the term "previous channel" and "next channel" by "previous n channels" and "next n channels", where 1<=n<=TotalNumberChannels.

While the particular MOBILE TV SYSTEM AND METHOD WITH FAST CHANNEL CHANGE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

I claim:

1. A method for providing data, comprising:
   receiving a channel change command; and
   in response to the channel change command, energizing a portion of a device at least during periods in which data from an old channel and data from a new channel are present in a signal while receiving data at a first bit rate, data being received in a power save mode at a second bit rate different from the first bit rate.

2. The method of claim 1, wherein the portion is energized during periods in which data from a "next" channel is present in the signal.

3. The method of claim 1, wherein the old channel is a channel displayed on the device just prior to receiving the channel change command, the new channel is the channel selected by the channel change command, and the portion is deenergized after a timeout period during all periods except periods in which data from the new channel is present in the signal to assume the power save mode.

4. The method of claim 1, wherein the portion is automatically changed to the power save mode after the timeout period.

5. The method of claim 2, wherein the "next" channel is the channel having data sent in the signal immediately after data from the new channel is sent in the AV signal.

6. The method of claim 2, wherein the "next" channel is a user-designated favorite channel.

7. The method of claim 1, wherein energizing the portion of the device at least during periods in which data from the old channel and data from the new channel are present in the signal establishes a multiple channel reception mode, and the method further comprises configuring the device in the multiple channel reception mode in response to a scan command.

8. The method of claim 1, wherein energizing the portion of the device at least during periods in which data from the old channel and data from the new channel are present in the signal establishes a multiple channel reception mode, and the method further comprises configuring the device in the multiple channel reception mode in response to a surf command, and the timeout period is effectively set to infinity.

9. The method of claim 3, wherein energizing the portion of the device at least during periods in which data from the old channel and data from the new channel are present in the signal establishes a multiple channel reception mode, and the first bit rate is a relatively low bit rate in the multiple channel reception mode and the second bit rate is a relatively high bit rate in the power save mode.

10. A device, comprising:
    a receiver;
    an audio and/or video display device configured to display audio and/or video (AV) signals; and
    a processor communicating with the receiver, display device, and executing logic comprising:
        configuring a portion of the mobile device in a power save mode and receiving data at a first bit rate when using the device until a predetermined command is received at which point receiving data at a second bit rate and configuring the portion in a multiple channel reception mode.

11. The device of claim 10, wherein the processor reconfigures the portion in the power save mode at the elapse of a timeout period.

12. The device of claim 10, wherein the data is content and wherein when in the multiple channel reception mode, the portion is energized at least during periods in which content from an old channel and content from a new channel are present in a AV signal, and when in the power save mode, the portion is deenergized during all periods except periods in which content from the new channel is present in the AV signal.

13. The device of claim 12, wherein when in the multiple channel reception mode, the portion is energized during periods in which content from a "next" channel is present in the AV signal.

14. The device of claim 10, wherein the portion is automatically changed to the power save mode after a timeout period.

15. The device of claim 13, wherein the "next" channel is the channel having content sent in the AV signal immediately after content from the new channel is sent in the AV signal.

16. The device of claim 13, wherein the "next" channel is a user-designated favorite channel.

17. The device of claim 10, wherein the portion is configured in the multiple channel reception mode in response to a scan command.

18. The device of claim 10, wherein the portion is configured in the multiple channel reception mode in response to a surf command.

19. The device of claim 10, wherein content is received at the second bit rate which is a relatively low bit rate in the multiple channel reception mode and the first bit rate is a relatively high bit rate in the power save mode.

20. A device, comprising:
    a circuit for processing content from at least first and second content sources;
    the circuit receiving a content source change command;
    the circuit being configured the circuit in a reduced power mode in which data is received at a first bit rate, wherein the circuit is energized only for portions of a signal carrying content from the first content source; and
    the circuit being responsive to the content source change command to receive content at a second bit rate different from the first bit rate, wherein the circuit is energized at least for portions of a signal carrying content from the first content source and for portions of the signal carrying content from the second content source.

* * * * *